US012626716B2

(12) United States Patent
Tang et al.

(10) Patent No.: US 12,626,716 B2
(45) Date of Patent: May 12, 2026

(54) METHODS AND SYSTEMS FOR VOICE CONTROL

(71) Applicant: Comcast Cable Communications, LLC, Philadelphia, PA (US)

(72) Inventors: Raphael Tang, Washington, DC (US); Karun Kumar, Washington, DC (US); Wenyan Li, Washington, DC (US); Gefei Yang, Washington, DC (US); Yajie Mao, Washington, DC (US); Yang Hu, Washington, DC (US); Rui Min, Washington, DC (US); Geoffrey Murray, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 218 days.

(21) Appl. No.: 17/566,036

(22) Filed: Dec. 30, 2021

(65) Prior Publication Data

US 2023/0215459 A1 Jul. 6, 2023

(51) Int. Cl.
| | |
|---|---|
| *G10L 25/78* | (2013.01) |
| *G06F 9/48* | (2006.01) |
| *G10L 15/00* | (2013.01) |

(52) U.S. Cl.
CPC .............. *G10L 25/78* (2013.01); *G06F 9/485* (2013.01); *G10L 15/00* (2013.01)

(58) Field of Classification Search
CPC .......... H04M 9/10; G10L 25/78; G10L 17/00; G10L 15/00; G10L 2015/223; G10L 15/22; G06F 9/485; G06F 9/4881; G06F 9/48; G06F 3/167; G06F 3/16
See application file for complete search history.

(56) References Cited

U.S. PATENT DOCUMENTS

| | | | | |
|---|---|---|---|---|
| 10,789,041 B2 * | 9/2020 | Kim | ......................... | G06F 3/165 |
| 2012/0215539 A1 * | 8/2012 | Juneja | ..................... | G10L 15/22 |
| | | | | 704/E15.005 |
| 2015/0142438 A1 * | 5/2015 | Dai | ......................... | G10L 17/04 |
| | | | | 704/275 |
| 2017/0243586 A1 * | 8/2017 | Civelli | .................... | G10L 15/30 |

* cited by examiner

*Primary Examiner* — Huyen X Vo
(74) *Attorney, Agent, or Firm* — Ballard Spahr LLP

(57) ABSTRACT

A user device may detect speech and use "early exiting" when identifying a potential operational command in the detected speech. The implementation of early exiting may be based on a variable threshold, where variable sensitivity settings for the threshold may be used to control how quickly, and whether, an "early exit" or early prediction of an operational command will occur. An early exit threshold may be adjusted, for example, based on network conditions, to ensure optimal operational command determination from the audio.

21 Claims, 8 Drawing Sheets

| NETWORK CONDITION | NETWORK CONDITION METRIC |
|---|---|
| ERROR RATE | 10% |
| AVAILABLE BANDWIDTH | 1G/S |
| SNR | 1.5DB |
| LATENCY | 50MS |

220

| POTENTIAL COMMAND | INFERENCE SCORE |
|---|---|
| HBO | .6 |
| HSN | .2 |
| HGTV | .1 |
| HBHD | .1 |

230

INFERENCE
SCORE
THRESHOLD:
.7

| NETWORK CONDITION | NETWORK CONDITION METRIC |
|---|---|
| ERROR RATE | 10% |
| AVAILABLE BANDWIDTH | 400MB/S |
| SNR | 1.5DB |
| LATENCY | 50MS |

250

| POTENTIAL COMMAND | INFERENCE SCORE |
|---|---|
| HBO | .9 |
| HSN | .0 |
| HGTV | .05 |
| HBHD | .1 |

260

INFERENCE
SCORE
THRESHOLD:
.85

400

410
DETERMINE AN EARLY EXITING THRESHOLD

420
DETECT AUDIO

430
DETERMINE AN OPERATIONAL COMMAND AND CONFIDENCE VALUE

440
EXECUTE THE OPERATIONAL COMMAND

600

610
DETECT AUDIO

620
DETERMINE AN EARLY EXIT THRESHOLD

630
UPDATE THE EARLY EXIT THRESHOLD

640
DETERMINE A PARTIAL COMMAND AND A CONFIDENCE SCORE

650
EXECUTE AN OPERATIONAL COMMAND

METHODS AND SYSTEMS FOR VOICE CONTROL

BACKGROUND

Speech recognition systems facilitate human interaction with computing devices, such as voice-enabled smart devices, by relying on speech. Such systems employ techniques to identify words spoken by a human user based on a received audio input (e.g., detected speech input, an utterance) and, combined with speech recognition and natural language processing techniques determine one or more operational commands associated with the audio input. These systems enable speech-based control of a computing device to perform tasks based on the user's spoken commands. The speed at which the computing device, and/or a remote computing device, processes the received audio input has a direct impact on the user experience. Computational processing delays and network conditions such as traffic volume and error rates can negatively impact response times. Slow response times (e.g., the delay between when the user speaks and when the associated operational command is executed) degrade user experience.

SUMMARY

It is to be understood that both the following general description and the following detailed description are exemplary and explanatory only and are not restrictive. Methods and systems for voice control are described. A computing device may receive audio. The audio may comprise one or more utterances. For example, a user device may comprise a voice enabled device configured to receive and/or otherwise determine one or more utterances and may send the one or more utterances (and/or portions thereof) to the computing device. An utterance of the one or more utterances may comprise a word, a phrase, one or more portions thereof, combinations thereof, and the like. For example, the utterance may comprise one or more keywords. The computing device may be configured to process the one or more utterances and determine one or more operational commands associated with the one or more utterances.

The computing device may be configured for natural language processing ("NLP") and/or natural language understanding ("NLU") according to techniques known in the art. The computing device may be configured for "early exiting," wherein, based on detecting (e.g., capturing, interpreting, etc.) a portion of an operational command (e.g., a partial operational command, etc.), one or more operational commands or one or more tasks related thereto may be predictively determined and executed. For example, if the computing device detects a first portion of an utterance comprising "H," the computing device may determine one or more potential operational commands. For example, based on the first portion of the utterance "H," the computing device may determine a first potential operational command of the one or more potential operational commands (e.g., "HBO"), a second potential operational command of the one or more potential operational commands (e.g., "HGTV"), and a third potential operational command of the one or more potential operational commands (e.g., "HBSN").

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2A shows an example table;

FIG. 2B shows an example table;

DETAILED DESCRIPTION

Figure 1:
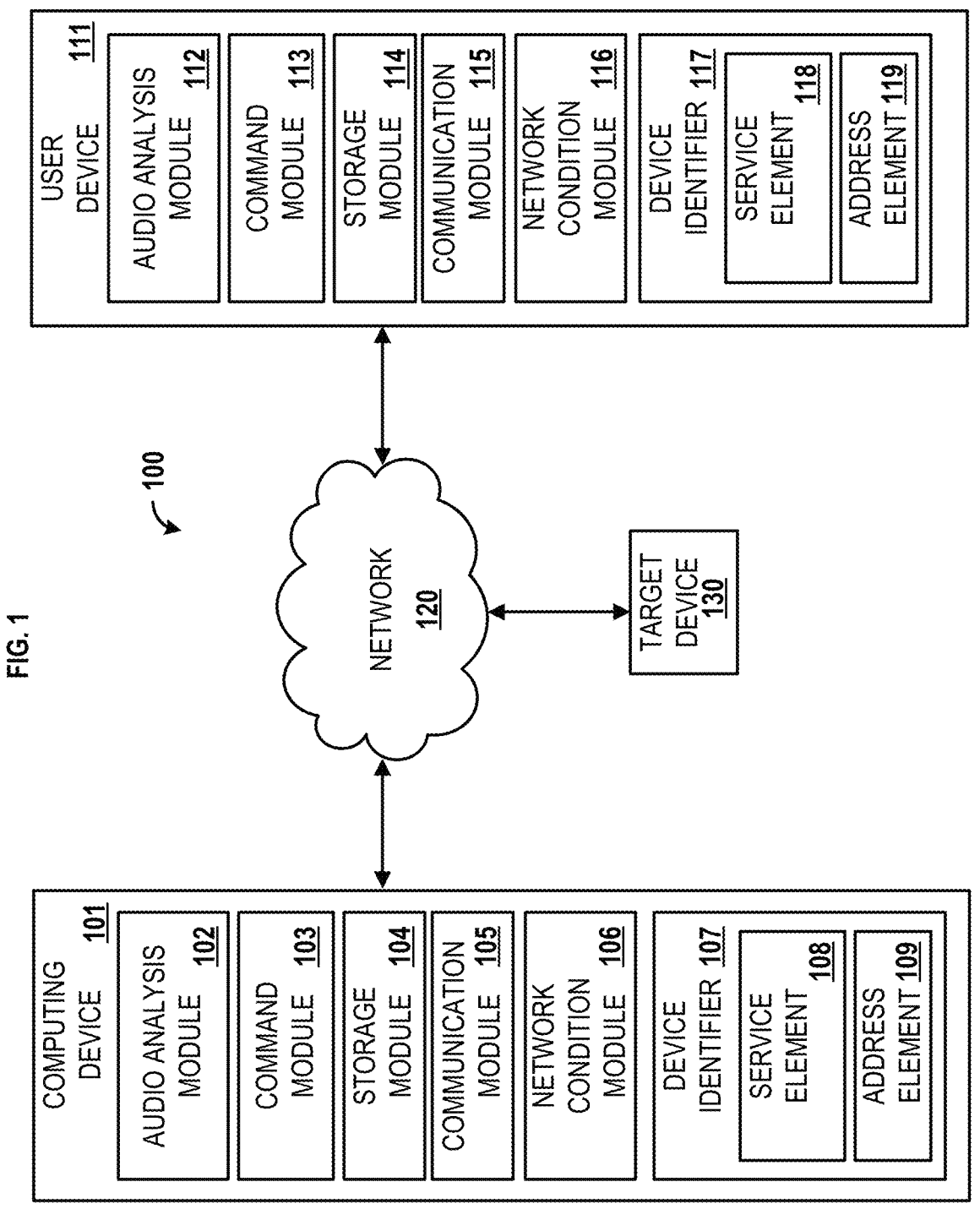
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

The computing device may determine an utterance confidence score indicating a confidence (e.g., an accuracy) of the detection of a user utterance (e.g., as opposed to background noise or some other audio input) comprising the operational command. The computing device may compare the utterance confidence score to an utterance confidence threshold to determine whether to accept the audio input (e.g., the partial operational command, etc.) as a user utterance (e.g., words spoken intentionally by a user) rather than dismissing the audio input as background noise or some other sound. For example, the computing device may determine received audio comprises the one or more utterances, rather than background noise. The user device may determine, based on the received audio, the utterance confidence score. The utterance confidence score may indicate a confidence (e.g., an accuracy) of the detection of an intentional user utterance (e.g., as opposed to background noise or some other audio input). The computing device may be configured to determine whether the utterance confidence score satisfies an utterance confidence threshold.

The computing device may determine an inference confidence score for each potential operational command of the one or more potential operational commands. The inference confidence score may indicate a likelihood that a partial utterance of a yet to be completed utterance will be associated with any given operational command. In other words, the inference confidence score may indicate a confidence in one or more inferred potential operational commands (e.g., "HBO" may be determined as a potential operational command based on determining a user utterance comprising "HB").

If a given inference confidence score associated with a given potential operational command satisfies the inference confidence threshold, the potential operational command may be executed before a complete utterance is received and/or otherwise determined.

One or more variable sensitivity settings for either or both of the utterance confidence threshold and/or the inference confidence threshold may be used to control how quickly, and whether, an "early exit" or preemptive determination of an operational command and/or an execution of the operational command and/or a task associated therewith may be executed. The one or more variable sensitivity settings may be associated with either or both of the utterance confidence threshold and/or the inference confidence threshold.

The one or more variable sensitivity settings (e.g., the utterance confidence threshold and/or the inference confidence threshold) may be adjusted based on one or more network conditions. The one or more network conditions may include, for example, a network traffic level, an amount of operational commands sent and received by a network (e.g., from a population of devices associated with a population of network users) an amount of data communicated, an amount of available bandwidth, an amount of errors within a network (e.g., an error rate associated with network communications), or an amount of operational commands received by the user device and/or a network device (e.g., a cloud device, a service, etc.) associated with the user device. Based on the one or more network conditions, the one or more variable sensitivity settings may be adjusted so as to increase or decrease either or both of the utterance confidence threshold and the inference confidence threshold.

For example, the computing device may determine available bandwidth is high (e.g., network traffic is low) and therefore may lower the inference confidence threshold such that less confidence in the predicted operational command is required before execution and thereby reducing latency between determining the user utterance and executing a predicted operational time. The computing device may lower the inference confidence threshold because, for example, high available bandwidth may allow for corrective action to be taken without negatively impacting the user experience of other users of the network.

Similarly, the computing device may determine available bandwidth is low (e.g., network traffic is high), and therefore may raise the inference confidence threshold such that a greater inference confidence score for the predicted operational command is required before executing the predicted operational command. By requiring a higher inference confidence threshold, the computing device may ensure greater predictive accuracy which in turn reduces corrective actions required by a user (e.g., a user manually executing an operational command that is different than the predicted operational command) and thereby reduces overall network traffic.

For example, the computing device may determine an error rate in the network is high. Based on the error rate, the computing device may raise or lower a confidence score threshold. For example, the computing device may determine a network error rate is high (e.g., the network is suffering a high rate of packet loss, a low signal-to-noise ratio, or the like), and therefore increase the inference confidence threshold to require a greater inference confidence in the predicted operational command. For example, the computing device may require a confidence of greater than 90% that an utterance comprising an operational command was received. By requiring a higher inference confidence threshold, the computing device may ensure greater predictive accuracy which in turn reduces corrective actions required by a user (e.g., a user manually executing an operational command that is different than the predicted operational command) and thereby reduces overall network traffic.

Similarly, the computing device may determine a network error rate is low (e.g., the network is not suffering a high rate of packet loss, a low signal-to-noise ratio, or the like), and therefore may decrease the inference confidence threshold to require lower inference confidence in the predicted operational command. By requiring a lower inference confidence, the computing device may more quickly (e.g., in fewer processing steps) determine a potential operational command which satisfies the inference confidences score threshold because there is less chance for a misinterpretation of the utterance due to, for example, packet loss across the network.

Similarly, the user device may be configured for NLP/NLU and may be configured to determine, based on a received audio input, the one or more utterances, the one or more potential operational commands, and the utterance confidence score and the inference confidence score as described above. The user device may be configured to determine the one or more network characteristics. For example, the user device may receive an indication of a network characteristic of the one or more network characteristics from the computing device. For example, the user device may be configured to determine the one or more network characteristics locally, based on data sent to and/or received from other devices on a local network. Based on the one or more network characteristics, the user device may adjust the one or more variable sensitivity settings associated with the utterance confidence threshold and the inference confidence threshold.

FIG. 1 shows an example system 100. The system 100 may comprise a computing device 101 (e.g., a computer, a server, a content source, etc.), a user device 111 (e.g., a voice assistant device, a voice-enabled device, a smart device, a computing device, etc.), a network 120, and a target device 130. The network 120 may be a network such as the Internet, a wide area network, a local area network, a cellular network, a satellite network, and the like. Various forms of communications may occur via the network 120. The network 120 may comprise wired and wireless telecommunication channels, and wired and wireless communication techniques.

The computing device 101 may comprise an audio analysis module 102, a command module 103, a storage module 104, a communication module 105, a network condition module 106, a device identifier 107, a service element 108, and an address element 109. The communications module 105 may be configured to communicate with (e.g., send and receive data to and from) other devices such as the user device 111 via the network 120.

The audio analysis module 102 may be configured to receive audio data. The audio data may be received from, for example, the user device 111. For example, the user device 111 may comprise a voice-enabled device. The user device 111 may comprise, for example, a microphone configured to detect audio. For example, a user may interact with the user device by pressing a button, speaking a wake word, or otherwise taking some action which activates the voice-enabled device. The audio data may comprise or otherwise be associated with one or more utterances, one or more phonemes, one or more words, one or more phrases, one or more sentences, combinations thereof, and the like spoken by a user. The user device 111 may send the audio data to the computing device 101. The computing device 101 may receive the audio data (e.g., via the communications module 105). The computing device 101 may process the audio data. Processing the audio data may comprise analog to digital conversion, digital signal processing, natural language processing, natural language understanding, filtering, noise reduction, combinations thereof, and the like.

The computing device 101, may, based on the audio data, determine an utterance confidence score indicating a confidence (e.g., an accuracy) of the detection of the one or more utterances (e.g., as opposed to background noise or some other audio input). The computing device 101 may compare the utterance confidence score to an utterance confidence threshold to determine the audio data comprises the one or more utterances.

The audio analysis module 102 may include a machine learning model and/or one or more artificial neural networks trained to execute early exiting processes and/or the like. For example, the audio analysis module 102 may include and/or utilize a recurrent neural network (RNN) encoder architecture and/or the like. The audio analysis module 102 may be configured for automatic speech recognition ("ASR"). The audio analysis module 102 may apply one or more voice recognition algorithms to the received audio (e.g., speech, etc.) to determine one or more phonemes, phonetic sounds, words, portions thereof, combinations thereof, and the like. The audio analysis module 102 may convert the determined one or more phonemes, phonetic sounds, words, portions thereof, combinations thereof, and the like to text and compare the text to one or more stored phonemes, phonetic sounds, and/or words (e.g., stored in the storage module 104, etc.), such as operational commands, wake words/phrases, and/or the like. Operational command phonemes, phonetic sounds, and/or words, may be stored (e.g., stored in the storage module 104, etc.), such as during a device (e.g., the user device 101, etc.) registration process, when a user profile associated with the user device 101 is generated, and/or any other suitable/related method. The audio analysis module 102 may determine an operational command from the received audio by performing speech-to-text operations that translate audio content (e.g., speech, etc.) to text, other characters, or commands.

The audio analysis module 102 may comprise an automatic speech recognition ("ASR") systems configured to convert speech into text. As used herein, the term "speech recognition" refers not only to the process of converting a speech (audio) signal to a sequence of words or a representation thereof (text), but also to using Natural Language Understanding (NLU) processes to understand and make sense of a user utterance. The ASR system may employ an ASR engine to recognize speech. The ASR engine may perform a search among the possible utterances that may be spoken by using models, such as an acoustic model and a language model. In performing the search, the ASR engine may limit its search to some subset of all the possible utterances that may be spoken to reduce the amount of time and computational resources needed to perform the speech recognition. ASR may be implemented on the computing device 101, on the user device 111, or any other suitable device. For example, the ASR engine may be hosted on a server computer that is accessible via a network. Various client devices may transmit audio data over the network to the server, which may recognize any speech therein and transmit corresponding text back to the client devices. This arrangement may enable ASR functionality to be provided on otherwise unsuitable devices despite their limitations. For example, after a user utterance is converted to text by the ASR, the server computer may employ a natural language understanding (NLU) process to interpret and understand the user utterance. After the NLU process interprets the user utterance, the server computer may employ application logic to respond to the user utterance. Depending on the translation of the user utterance, the application logic may request information from an external data source. In addition, the application logic may request an external logic process. Each of these processes contributes to the total latency perceived by a user between the end of a user utterance and the beginning of a response.

The computing device 101 may determine an utterance confidence threshold. The utterance confidence threshold may indicate an utterance confidence score required to execute early exiting. For example, the computing device 101 may require greater than 90% confidence that the audio data comprises at least one utterance (e.g., an intentional spoken command originating from a user, as opposed to background noise) in order to further process the audio data. The computing device 101 may determine the utterance confidence score satisfies the utterance confidence threshold. For example, the audio analysis module 102 may assign a confidence score indicative of the accuracy of whether the received audio includes a phoneme, phonetic sound, word, and/or words that correspond to and/or are associated with the one or more operational commands. A confidence score may be based on a scale, such as from a value of one (1) to ten (10), where scale values correspond to an accuracy of operational command detection. A confidence score may be based on any scale and/or value. The audio analysis module 102 may determine that the audio content includes one or more phonemes, phonetic sounds, and/or words, such as "HBO," that match/correspond to a stored operational command such as "HBO" and/or the like. Determining the utterance confidence score satisfies the utterance confidence threshold may comprise determining the received audio data (e.g., the audio input) comprises a command intentionally spoken by a user (e.g., rather than background noise or an unintentional command).

Based on the utterance confidence score satisfying the utterance confidence threshold, an audio analysis module 112 may determine the one or more utterances (and/or portions thereof) and send the one or more utterances or one or more portions of the one or more utterances to the command module 113.

The command module 103 may receive the one or more utterances and/or the one or more portions of the one or more utterances. The command module 113 may be configured for NLP and/or NLU and may determine, for example, one or more keywords or key phrases contained in the one or more utterances. Based on the one or more keywords, the command module may determine one or more potential operational commands. For example, the computing device may determine a first portion of an utterance may comprise a phoneme associated with an "H" sound (e.g., not the voiceless glottal fricative such as found in "who," or "how") pronounced /ˈeɪtʃ/ or "aitch." Based on determining the first portion of the utterance comprises "H," the computing device 101 may determine one or more potential operational commands. The one or more operational commands may comprise one or more channels, one or more operations (e.g., "tune to," "record," "play," etc.), one or more content titles, combinations thereof, and the like. For example, based on determining the "H," the computing device may determine the one or more potential operational commands comprise playing, recording, outputting, or otherwise accessing any one of "HBO," "HSN," "HGTV," or "HBHD." The command module 103 may determine whether a phoneme, phonetic sound, word, and/or words extracted/determined from the audio data match a stored phoneme, phonetic sound, word, and/or words associated with an operational command of the one or more operational commands. The command module 103 may determine whether the audio data includes a phoneme, phonetic sound, word, and/or words that correspond to and/or are otherwise associated with the operational command (e.g., did the user device 101 detect at least a portion of an operational command, such as "H" of "HBO," etc.).

The computing device may determine one or more inference confidence scores associated with the one or more potential operational commands. For example, the computing device 101 may determine an inference confidence score for each potential operational command of the one or more potential operational commands. The one or more inference confidence scores may indicate a probability that a user will ultimately execute one of the one or more potential operational commands (e.g., tune to a respective channel such HBO, HSN, HGTV, or HBHD). For example, the computing device 101 may determine one or more viewing histories. The one or more viewing histories may be associated with, for example, a viewing population, a household, an individual user, a group of users, a device (e.g., a media device such as a set-top-box (STB)). For example, the computing device 101 may determine a viewing history associated with a first user. The viewing history may indicate that 60% of the time, after the user utters "H" the user ultimately tunes to HBO channel, that 20% of the time, after the user utters "H," the user ultimately tunes to HSN channel, that 10% of the time, after the user utters "H," the user ultimately tunes to HGTV channel, and that 10% of the time, after the user utters "H," the user ultimately tunes to HBHD channel. Accordingly, the computing device 101 may determine a first inference confidence score of 0.6 associated with HBO, a second inference confidence score of 0.2 associated with HSN, a third inference confidence score 0.1 associated with HGTV, and a fourth inference confidence score of 0.1 associated with HBHD.

The computing device 101 (e.g., via the network condition module 106) may determine an inference confidence threshold. The computing device 101 may determine the inference confidence threshold based on a network condition such as a network traffic indicator (e.g., inversely as available bandwidth), a packet loss rate, a signal-to-noise ratio, other network characteristics as are known in the art, combinations thereof, and the like. For example, the network traffic indicator may indicate an amount of data sent or received (e.g., transmitted) over the network per unit time (e.g., as measured in megabits per second). The computing device 101 may determine the inference confidence threshold based on the network condition. For example, the computing device 101 may determine network traffic is average (e.g., and therefore available bandwidth is average) and, based on the high network traffic, may determine an inference confidence threshold of 0.7. Because none of the first through fourth inference confidence scores are 0.7 or greater, the inference confidence score may not be satisfied and therefore, the computing device may not execute an early exit function (e.g., may not preemptively execute a potential operational command of the one or more potential operational commands).

The computing device may receive a second portion of the utterance. The second portion of the utterance may comprise a user speaking "B." Based on the second portion of the utterance, the computing device may determine a second one or more inference confidence scores associated with a second one or more potential operational commands. For example, the computing device 101 may determine that 0% of the time after the user utters "HB," does the user ultimately turn to HSN. Therefore, the computing device 101 may remove HSN from the one or more potential operational commands. The computing device 101 may determine that that 90% of the time, after the user utters "HB" the user ultimately tunes to HBO channel, that 0% of the time, after the user utters "HB," the user ultimately tunes to HSN channel, that 5% of the time, after the user utters "HB," the user ultimately tunes to HGTV channel, and that 5% of the time, after the user utters "HB," the user ultimately tunes to HBHD channel. Accordingly, the computing device 101 may adjust the first inference confidence score associated with HBO to 0.9, the second inference confidence score associated with HSN to 0, the third inference confidence score associated with HGTV to 0.05, and the fourth inference confidence score associated with HBHD to 0.05.

The computing device 101 may determine an inference confidence score associated with a potential operational command satisfies the inference confidence threshold. For example, if the inference confidence threshold remains unchanged (e.g., the inference confidence threshold remains 0.7 because no changes in the network condition have been detected), the inference confidence score associated with HBO satisfies the inference confidence threshold. Based on the inference confidence score associated with HBO satisfying the inference confidence threshold, the computing device 101 may preemptively perform an operational command associated with HBO rather than waiting for additional data (e.g., rather than waiting for a third portion of the utterance). For example, rather than delaying executing the operational command until the user utters "O," the operational command may be executed preemptively. For example, the operational command may comprise checking an availability of a network connection to an HBO server. For example, the operational command may comprise tuning to an HBO channel.

The computing device 101 may determine a change in the network condition. For example, the network condition module 106 may determine that network traffic has increased. Based on the increased network traffic, the computing device 101 may adjust the inference confidence threshold. For example, the computing device 101 may raise the inference confidence threshold to 0.85. The increased inference confidence threshold may require a greater inference confidence score for the predicted operational command to be executed. By requiring a higher inference confidence threshold, the computing device may ensure greater predictive accuracy which in turn reduces corrective actions required by a user (e.g., a user manually executing an operational command that is different than the predicted operational command) and thereby reduces overall network traffic. For example, the 0.9 inference confidence score associated with HBO satisfies the 0.85 inference confidence threshold, and thus, the computing device may execute the HBO operational command before determining the utterance comprises an "O."

The user device 111 may comprise the audio analysis module 112, a command module 113, a storage module 114, a communications module 115, a network condition module 116, a device identifier 117, a service element 118, and an address element 119.

The user device 111 may comprise a microphone or other component configured to detect audio. For example, the user device 111 may comprise an audio analysis module 112. The audio analysis module 112 may comprise the microphone. The audio analysis module 112 may be configured to detect audio. The audio analysis module 112 may be configured to convert a received analog signal to a digital signal. For example, the utterance detection 102 may comprise an analog to digital converter. The audio analysis module 112 may be configured to determine, based on the detected audio, whether or not the detected audio comprises an utterance.

The audio analysis module 112 may determine audio originating from a user speaking in proximity to the user device 111. The audio analysis module 112 may include one or more microphones, or the like that, configured to receive the audio. The audio may be content (e.g., speech, etc.) that originates from and/or may be caused by a user, a device (e.g., a television, a radio, a computing device, etc.), and/or the like. The audio analysis module 112 may determine the audio may comprises one or more phonemes, one or more words, one or more phrases, portions thereof, combinations thereof, and the like. Based on the one or more phonemes, the one or more words, the one or more phrases, combinations thereof, and the like, the utterance detection module may determine the audio comprises one or more utterances. The audio analysis module 112 may determine, based on, for example, known digital signal processing techniques, an utterance confidence score associated with the audio. The utterance confidence score may indicate a likelihood that the received audio comprises an utterance. The utterance detection module 102 may determine the utterance confidence score satisfies an utterance confidence threshold. Based on the utterance confidence score satisfying the utterance confidence threshold, the audio analysis module 112 may send the determined utterance to the command module 113.

The audio analysis module 112 may determine that audio content includes one or more phonemes, phonetic sounds, and/or words that relate to an operational command "HBO," such as "tune to HBO," "preview HBO," "select HBO," and/or any other phonemes, phonetic sounds, and/or words that may be ambiguously associated with the stored operational command. Selecting between similar operational commands such as "tune to HBO," "preview HBO," "select HBO," and/or the like may be based, for example, on when the audio content is detected and historical operational commands received by the user device 111.

The audio analysis module 112 may assign a confidence score of eight (8) to a phoneme, phonetic sound, word, and/or words that are similar to such as "H," that match, correspond to, and/or associated with a stored operational command associated with the user device 111 such as "tune to HBO," "preview HBO," "select HBO," and/or the like which indicates that the phoneme, phonetic sound, word, and/or words determined from the audio content are close (e.g., similar, a partial match, less than percent accuracy, etc.) to at least one operational command. The audio analysis module 112 may assign a confidence score of two (2) to one or more words that are not similar to one or more operational commands "tune to HBO," "preview HBO," "select HBO," and/or the like such as, "harmony in the day," which indicates that the phoneme, phonetic sound, word, and/or words determined from the audio content are weakly related (e.g., somewhat similar, a partial match, less than 10% percent accuracy, etc.) to the stored one or more operational commands. The audio analysis module 103 may assign any confidence score indicative of the accuracy of a phoneme, phonetic sound, word, and/or words determined from audio content corresponding to one or more operational commands.

For example, the user device 111 may determine a current time when audio is detected, determine similar (historical) operational commands received at a similar time, and select a most probable operational command to be associated with one or more phonemes, phonetic sounds, and/or words based on the similar (historical) operational commands received at a similar time. For example, one or more phonemes, phonetic sounds, and/or words detected by the user device 111 at 5 PM on a Wednesday (or any other time frame), may be compared to one or more historical phonemes, phonetic sounds, and/or words detected by the user device 111 on a previous Wednesday at 5 PM (or any other previous time frame) to determine a most probable operational command.

The audio analysis module 112 may compare the utterance confidence score to the utterance confidence threshold. The audio analysis module 112 may determine to accept the phoneme, phonetic sound, word, and/or words included with the audio content as at least a partial operational command when the utterance confidence score is equal to and/or satisfies the threshold, and may determine not to accept the phoneme, phonetic sound, word, and/or words as the operational command when the confidence score does not satisfy the threshold. The threshold may be a value, such as a threshold value of six (6). Audio content that includes phonemes, phonetic sounds, and/or words that are similar to an operational command "tune to HBO," "preview HBO," "select HBO," such as "HBO," may be assigned a confidence score of eight (8). The audio content including the phonemes, phonetic sounds, and/or words that are similar to the stored one or more operational commands may satisfy the threshold because the assigned confidence score of eight (8) is greater than the threshold value of six (6). The threshold may be any value. The threshold may be satisfied by a confidence score that is equal to, or greater than, the threshold value. A confidence score that is less than the threshold value may not satisfy the threshold. The audio analysis module 103 may modify the threshold based on one or more network conditions.

The user device 111 may include a network conditions module 116. The network conditions module 116 may be configured to determine network condition information for the network 120 (and/or any other network associated with the user device 111) and share determined network condition information with the audio analysis module 112. The network conditions module 116 may determine network condition information by monitoring communications to and from the user device 111. Network conditions may be determined based on the detected performance of one or more applications, communication protocols, and/or the like. The network conditions module 116 may be configured to determine network condition information such as quality of services parameters, error rates, bandwidth, throughput, transmission delay, availability, jitter, and/or the like. Network conditions may include, for example, an amount of data communicated (e.g., by/to the user device 111, by/to a device associated with the user device 111, within the network 120, etc.), an amount of available bandwidth (e.g., an amount of bandwidth available to the user device 111, an amount of bandwidth available to a device associated with the user device 111, an amount of bandwidth available within the network 120 and/or any other network associated with the user device 111, etc.), an amount and/or frequency of errors within the network 120 and/or any other network associated with the user device 111, and/or an amount of operational commands received by the user device 111 and/or a network device (e.g., a cloud-based device, a server, a computing device 101, etc.) associated with the user device 111.

The user device 111 may be associated with a device identifier 117. The device identifier 117 may be any identifier, token, character, string, or the like, for differentiating one user device (e.g., the user device 111, etc.) from another user device. The device identifier 117 may identify user device 111 as belonging to a particular class of user devices. The device identifier 117 may include information relating to the user device 111 such as a manufacturer, a model or type of device, a service provider associated with the user device 111, a state of the user device 111, a locator, and/or a label or classifier. Other information may be represented by the device identifier 117.

The device identifier 117 may have a service element 118 and an address element 119. The service element 118 may have or provide an internet protocol address, a network address, a media access control (MAC) address, an Internet address, or the like. The address service 118 may be relied upon to establish a communication session between the user device 111, a computing device 101, or other devices and/or networks. The address element 119 may be used as an identifier or locator of the user device 101. The address element 119 may be persistent for a particular network (e.g., network 120, etc.).

The service element 118 may identify a service provider associated with the user device 111 and/or with the class of the user device 111. The class of the user device 111 may be related to a type of device, a capability of a device, a type of service being provided, and/or a level of service (e.g., business class, service tier, service package, etc.). The service element 118 may have information relating to and/or provided by a communication service provider (e.g., Internet service provider) that is providing or enabling data flow such as communication services to the user device 111. The service element 118 may have information relating to a preferred service provider for one or more particular services relating to the user device 111. The address element 119 may be used to identify or retrieve data from the service element 118, or vice versa. One or more of the address element 119 and the service element 118 may be stored remotely from the user device 111 and retrieved by one or more devices such as the user device 111, the computing device 101, or any other device. Other information may be represented by the service element 118.

The user device 111 may include a communication module 115 for providing an interface to a user to interact with the computing device 101. The communication module 115 may be any interface for presenting and/or receiving information to/from the user, such as user feedback. An interface may be communication interface such as a web browser (e.g., Internet Explorer®, Mozilla Firefox®, Google Chrome®, Safari®, or the like). The communication module 115 may request or query various files from a local source and/or a remote source. The communication module 115 may transmit and/or data, such as audio content, telemetry data, network status information, and/or the like to a local or remote device such as the computing device 101.

FIG. 2A shows a table 210 comprising one or more network conditions and associated one or more network condition metrics at a first time. The one or more network conditions and associated one or more network condition metrics may be determined by either or both the computing device 101 and/or the user device 111. FIG. 2A also shows a table 220 comprising one or more potential operational commands and associated one or more inference confidence scores. The first time may comprise a point in time after only a first portion of an utterance has been determined. For example, the first portion may comprise a phoneme associated with a user pronouncing the letter "H," as described above. Table 210 also shows one or more inference confidence scores associated the one or more operational commands. The one or more inference confidence scores may be associated with a viewing history associated with a device and/or a user. For example, the viewing history may indicate that 60% of the time, after the user utters "H" the user ultimately tunes to HBO channel, that 20% of the time, after the user utters "H," the user ultimately tunes to HSN channel, that 10% of the time, after the user utters "H," the user ultimately tunes to HGTV channel, and that 10% of the time, after the user utters "H," the user ultimately tunes to HBHD channel. Accordingly, the computing device 101 may determine a first inference confidence score of 0.6 associated with HBO, a second inference confidence score of 0.2 associated with HSN, a third inference confidence score 0.1 associated with HGTV, and a fourth inference confidence score of 0.1 associated with HBHD.

FIG. 2B shows a table 240 comprising the one or more network conditions and associated updated one or more network condition metrics at a second time. The second time may be associated with a time after a change in a network condition of the one or more network conditions has been determined. The second time may be associated with a time after a second portion of the utterance has been determined. The updated one or more network conditions may be determined by either or both of the computing device 101 and/or the user device 111 (e.g., by the network condition module 105 and/or the network condition module 116). For example, the change in the network condition may comprise an increase in network traffic and therefore, a reduction in available bandwidth. In table 240, the available bandwidth has been reduced to 400 mb/s, thus, there is less available bandwidth at the second time. Further, the second time may comprise a time after the second portion of the utterance has been received. For example, the second portion of the utterance may comprise a determination that the user has uttered a phoneme associated with the user speaking the letter "B," as described above. Based on the second portion of the utterance, the computing device may determine a second one or more inference confidence scores associated with a second one or more potential operational commands. For example, the computing device 101 may determine that 0% of the time after the user utters "HB," does the user ultimately turn to HSN. Therefore, the computing device 101 may remove HSN from the one or more potential operational commands. The computing device 101 may determine that that 90% of the time, after the user utters "HB" the user ultimately tunes to HBO channel, that 0% of the time, after the user utters "HB," the user ultimately tunes to HSN channel, that 5% of the time, after the user utters "HB," the user ultimately tunes to HGTV channel, and that 5% of the time, after the user utters "HB," the user ultimately tunes to HBHD channel. Accordingly, the computing device 101 may adjust the first inference confidence score associated with HBO to 0.9, the second inference confidence score associated with HSN to 0, the third inference confidence score associated with HGTV to 0.05, and the fourth inference confidence score associated with HBHD to 0.05. For example, the 0.9 inference confidence score associated with HBO satisfies the 0.85 inference confidence threshold, the computing device may execute the HBO operational command before determining the utterance comprises an "O."

Figure 3:
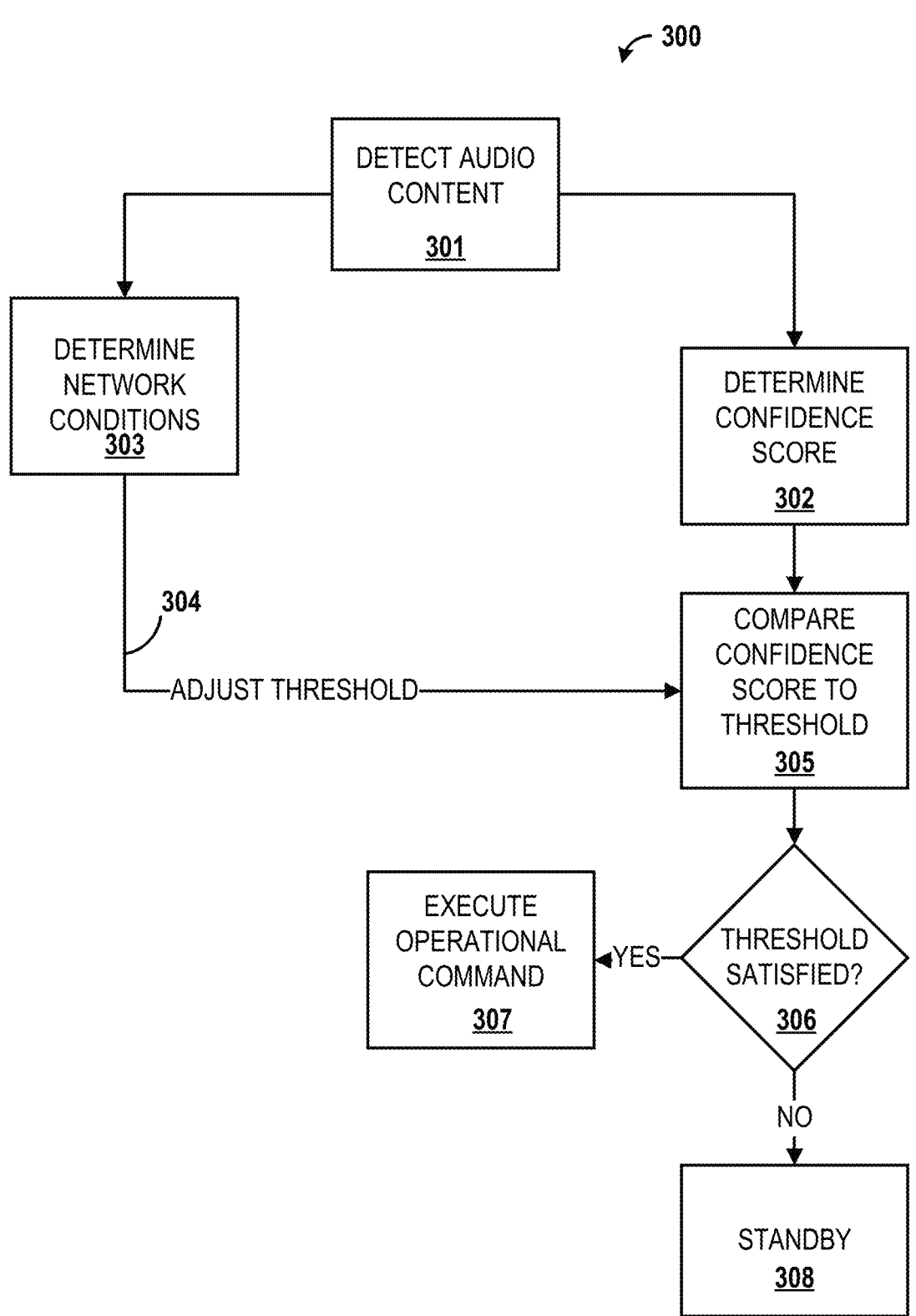
FIG. 3 shows an example flowchart.

FIG. 3 shows a process 300 for voice control. A computing device (e.g., a voice control server, voice assistant device, voice-enabled device, smart device, computing device, the user device 101, etc.) may be configured for "early exiting," wherein, based on a portion of an operational command (e.g., a partial operational command, etc.), a complete operational command may be predictively determined and/or preemptively executed. At 301, the computing device may receive and/or otherwise determine audio. The audio may comprise sound such as human speech and/or background noise. For example, a user in proximity to a user device may speak one or more utterances. For example, the user device may include one or more microphones, sensors, and/or the like, configured to detect/receive the audio. The user device may be configured with a microphone or other means for detecting audio signals and detect background noise and/or the one or more utterances. The user device may convert the analog one or more utterances to one or more digital signals. The user device may send the one or more utterances to the computing device. The one or more utterances may comprise and/or correspond to one or more operational commands. For example, a user may speak "HBO," which may correspond to an operational command such as "tune to HBO," "preview HBO," "select HBO," and or the like.

The computing device may determine whether the audio content (e.g., speech, etc.) includes an operational by performing ASR and/or speech-to-text operations and/or applying one or more voice recognition algorithms to the audio content to determine text, such as a word and/or words. The computing device may compare the text (e.g., the extracted word and/or words, etc.) to a stored text (e.g., a stored word and/or stored words, etc.), such as an operational command(s). The computing device may extract a phoneme, phonetic sound, word, and/or words. The computing device may access a storage that includes the operational command(s) and/or phonemes associated with the operational command(s), phonetic sounds associated with the operational command(s), and/or the like to determine whether at least a portion of the operational command(s) is detected from the audio content.

At 302, the computing device may determine an utterance confidence score indicative of the accuracy of the detection of the operational command(s) (e.g., did the computing device and/or user device detect an operational command(s), a different/similar operational command(s), background noise, etc.). The utterance confidence score may be based on a scale, such as from a value between 0 and 1, 1 to 10, or any other scale. A value on the scale may indicate an accuracy of operational command detection. The computing device may determine that the audio content includes one or more phonemes, phonetic sounds, and/or words that match a stored operational command(s) "HBO." For example, the computing device may assign a confidence score of ten (10) to the one or more words determined from the audio content. The confidence score of ten (10) may indicate that the one or more phonemes, phonetic sounds, and/or words match (e.g., substantially correspond, approximately 100 percent accuracy, etc.) one or more portions of the operational command(s). One or more phonemes, phonetic sounds, and/or words that are similar to the operational command(s) may be assigned a confidence score of eight (8). The confidence score of eight (8) may indicate that the one or more phonemes, phonetic sounds, and/or words determined from the audio content are close (e.g., similar, a partial match, less than percent accuracy, etc.) to the operational command(s). One or more phonemes, phonetic sounds, and/or words detected/determined from the audio content may be assigned a confidence score of two (2). The confidence score of two (2) may indicate that the one or more phonemes, phonetic sounds, and/or words are weakly related (e.g., somewhat similar, a partial match, less than percent accuracy, etc.) to the stored operational command(s). The computing device may assign any confidence score indicative of the accuracy of detection of the operational command(s) (e.g., determining one or more phonemes, phonetic sounds, and/or words that match/correspond to a stored operational command(s), etc.).

The computing device may determine an inference confidence score. For example, if the computing device determines the one or more utterances comprise at least a portion of an operational command of the one or more operational commands, the computing device may determine one or more potential operational commands associated with the at least a portion of the operational command and may further determine an inference confidence score associated with each potential operational command of the one or more potential operational commands. For example, the computing device may determine one or more keywords or key phrases contained in the one or more utterances. Based on the one or more keywords, the command module may determine the one or more potential operational commands. For example, the computing device may determine a first portion of an utterance may comprise a phoneme associated with an "H" sound (e.g., not the voiceless glottal fricative such as found in "who," or "how") but rather the /ˈertʃ/ or "aitch" sounds associated with pronunciation of the letter "H." While the example phoneme comprises a user speaking a letter, a person skilled in the art will appreciate that any sound or word or phrase or the like may be determined. Based on determining the first portion of the utterance comprises "H," the computing device 101 may determine the one or more potential operational commands. The one or more operational commands may comprise one or more channels, one or more operations (e.g., "tune to," "record," "play," etc.), one or more content titles, combinations thereof, and the like. For example, based on determining the "H," the computing device may determine the one or more potential operational commands comprise playing, recording, outputting, or otherwise accessing any one of "HBO," "HSN," "HGTV," or "HBHD."

The computing device 101 may determine an inference confidence score for each potential operational command of the one or more potential operational commands. The inference confidence score may indicate a likelihood that a complete utterance will be associated with any given operational command. In other words, the inference confidence score may indicate a confidence in an inferred potential operational command.

For example, the one or more inference confidence scores may be determined based on a viewing history associated with a device and/or a user. For example, the viewing history may indicate that 60% of the time, after the user utters "H" the user ultimately tunes to HBO channel, that 20% of the time, after the user utters "H," the user ultimately tunes to HSN channel, that 10% of the time, after the user utters "H," the user ultimately tunes to HGTV channel, and that 10% of the time, after the user utters "H," the user ultimately tunes to HBHD channel. Accordingly, the computing device may determine a first inference confidence score of 0.6 associated with HBO, a second inference confidence score of 0.2 associated with HSN, a third inference confidence score 0.1 associated with HGTV, and a fourth inference confidence score of 0.1 associated with HBHD.

At 303, the computing device may determine one or more network conditions, such as current network conditions (e.g., a current bandwidth/throughput level, available bitrate, current communication errors, etc.), previous network conditions (e.g., historic bandwidth/throughput levels, average bitrate over time, an amount and/or type of previous communication errors, etc.), and/or anticipated network conditions (e.g., an expected bandwidth/throughput level, a requested/anticipated bitrate, predicted communication errors based on various indicators and/or a trained machine learning model, etc.). The one or more network conditions may include, for example, an amount of data communicated (e.g., by/to the computing device, by/to a device associated with the computing device, within a network associated with the computing device, etc.), an amount of available bandwidth (e.g., an amount of bandwidth available to the computing device, an amount of bandwidth available to a device associated with the computing device, an amount of bandwidth available within a network associated with the computing device, etc.), an amount of errors, or an amount of operational commands received by the computing device and/or a network device (e.g., a cloud-based device, a server, a computing device, etc.) associated with the computing device. The one or more network conditions may be determined by the computing device and/or an indication of network conditions may be received from a network device (e.g., a cloud-based device, a server, a computing device, etc.). Block 302 and block 303 may be performed in any order, including in parallel.

At 304, a threshold (e.g., an early exiting threshold, an utterance confidence threshold, an inference confidence threshold, etc.) may be determined and/or adjusted. The threshold may be adjusted based on the network conditions. For example, computing device may determine an utterance confidence threshold. The utterance confidence threshold may indicate an utterance confidence score required to execute early exiting. For example, the computing device may require greater than 90% confidence that the audio data comprises the one or more utterances in order to further process the audio data. The computing device may determine the utterance confidence score satisfies the utterance confidence threshold. Based on the utterance confidence score satisfying the utterance confidence threshold, the computing device may determine one or more operational commands associated with the one or more utterances.

For example, the computing device 101 (e.g., via the network condition module 106) may determine an inference confidence threshold. The computing device may determine the inference confidence threshold based on a network condition such as a network traffic indicator (e.g., inversely as available bandwidth), a packet loss rate, a signal-to-noise ratio, other network characteristics as are known in the art, combinations thereof, and the like. For example, the network traffic indicator may indicate an amount of data sent or received (e.g., transmitted) over the network per unit time (e.g., as measured in megabits per second). The computing device may determine the inference confidence threshold based on the network condition. For example, the computing device may determine network traffic is average (e.g., and therefore available bandwidth is average) and, based on the high network traffic, may determine an inference confidence threshold of 0.7. Because none of the first through fourth inference confidence scores are 0.7 or greater, the inference confidence score may not be satisfied and therefore, the computing device may not execute an early exit function (e.g., may not preemptively execute a potential operational command of the one or more potential operational commands).

For example, a low amount of network errors and/or latency may cause the computing device to utilize a high utterance confidence threshold because the audio content may be accurately, readily, and/or timely determined (e.g., with little chance of misinterpretation, etc.). Alternatively, a high amount of network errors and/or latency may cause the computing device to utilize a low utterance confidence threshold to enable an operational command to be executed when portions of audio may be missing/corrupted due to errors or detected/determined slowly due to latency. The threshold may be adjusted based on any network condition(s) to ensure optimal operational command determination from the audio content.

For example, based on increased network traffic, the computing device may adjust the inference confidence threshold. For example, using the above described scenario, the computing device may raise the inference confidence threshold to 0.85. The increased inference confidence threshold may require a greater inference confidence score for the predicted operational command to be executed. By requiring a higher inference confidence threshold, the computing device may ensure greater predictive accuracy which in turn reduces corrective actions required by a user (e.g., a user manually executing an operational command that is different than the predicted operational command) and thereby reduces overall network traffic. For example, the 0.9 inference confidence score associated with HBO satisfies the 0.85 inference confidence threshold, the computing device may execute the HBO operational command before determining the utterance comprises an "O."

At 305, the computing device 101 may compare either or both of the utterance confidence score to the utterance confidence threshold and/or the inference confidence score to the inference confidence threshold. If the given inference confidence score associated with a given potential operational command satisfies the inference confidence threshold, the potential operational command may be executed before the complete utterance is received and/or otherwise determined.

At 306, the computing device 101 may determine to accept the one or more phonemes, phonetic sounds, and/or words included with the audio content as the operational command if the utterance confidence score is equal to and/or satisfies the threshold. The computing device may determine not to accept the one or more phonemes, phonetic sounds, and/or words as the operational command if the utterance confidence score does not satisfy the threshold. The threshold may be a value, such as a threshold value of six (6). If the audio content is associated with an utterance confidence score of ten (10), such as one or more words that match (e.g., substantially correspond, approximately 100 percent accuracy, etc.) the stored operational command, then the computing device may or may not accept the one or more phonemes, phonetic sounds, and/or words as the operational command. If the audio content is associated with an utterance confidence score of eight (8), such as one or more phonemes, phonetic sounds, and/or words determined from the audio content are close (e.g., similar, a partial match, less than percent accuracy, etc.) to the stored operational command, then the computing device may or may not accept the one or more phonemes, phonetic sounds, and/or words as the operational command. If the audio content is associated with an utterance confidence score of two (2), such as are weakly related (e.g., somewhat similar, a partial match, less than percent accuracy, etc.) to the stored operational command, then the computing device may or may not accept the one or more phonemes, phonetic sounds, and/or words as the operational command. The computing device may or may not accept the one or more phonemes, phonetic sounds, and/or words as the operational command based on any correlation between a confidence score and the threshold (e.g., the early exiting threshold, etc.). The computing device, may raise and lower the threshold and/or determine which confidence score values do or do not satisfy the threshold to decrease or increase scrutiny applied to operational command detection.

At 307 if the threshold is satisfied the computing device may execute the operational command. For example, the computing device may compare and/or apply the utterance confidence score to the utterance confidence threshold to determine whether to accept one or more words phonemes, phonetic sounds, and/or words determined from the audio content as an operational command or not. For example, the computing device may compare the inference confidence score to the inference confidence threshold and, the given inference confidence score associated with a given potential operational command satisfies the inference confidence threshold, the potential operational command may be executed before the complete utterance is received and/or otherwise determined. At 308, if the threshold is not satisfied, the computing device may not execute the operational command and may transition to a standby state.

Figure 4:
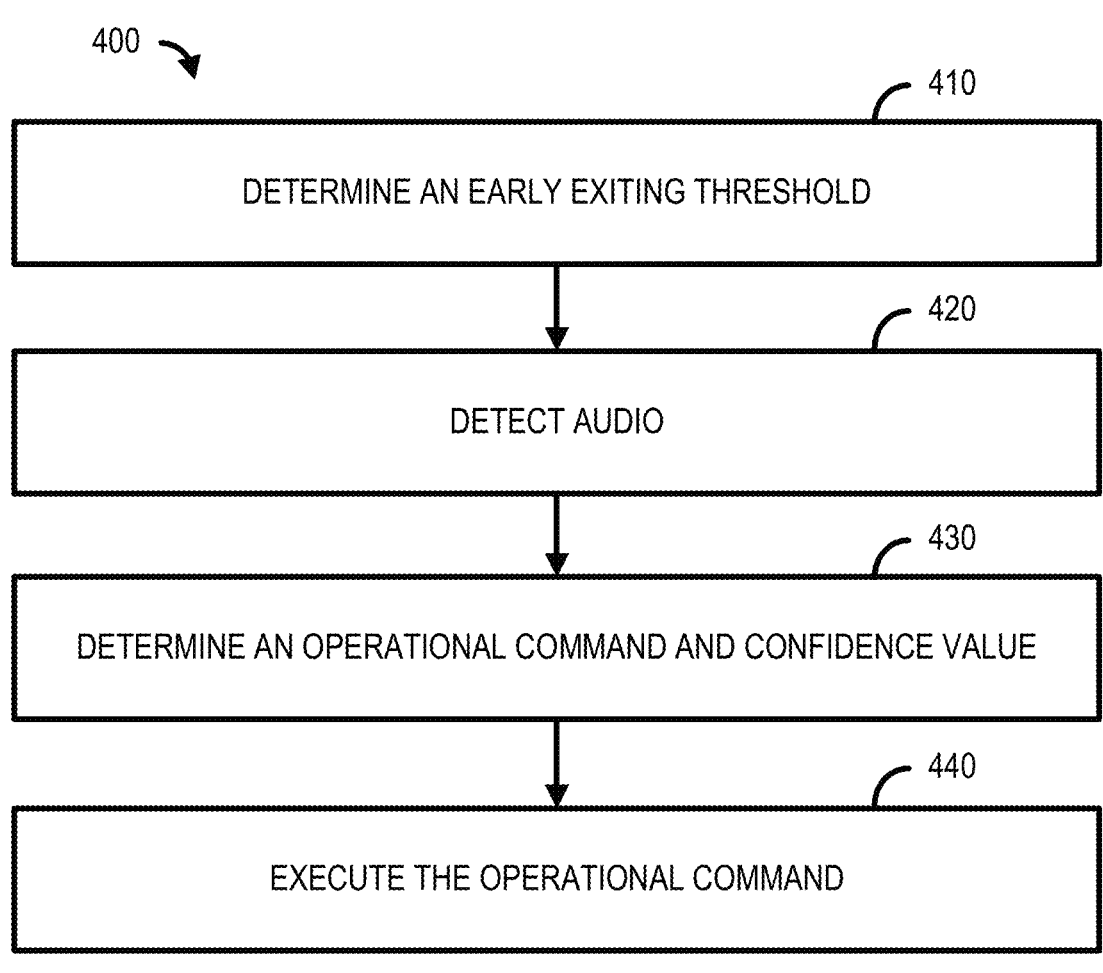
FIG. 4 shows an example flowchart.

FIG. 4 is a flowchart of an example method 400. The method may be carried out by any one or more of the devices described herein such as, for example, the computing device 101. At 410, an early exiting threshold may be determined. The early exiting threshold may be associated with one or more network conditions. The early exiting threshold may be associated with one or more variable sensitivity settings associated with. The one or more variable sensitivity settings associated with the early exiting threshold may be used to control how quickly, and whether, an "early exit" or early prediction of an operational command will occur. The sensitivity settings may be adjusted based on one or more network conditions. Network conditions may include, for example, an amount of data communicated (e.g., by/to the computing device, by/to a device associated with the computing device, within a network associated with the computing device, etc.), an amount of available bandwidth (e.g., an amount of bandwidth available to the computing device, an amount of bandwidth available to a device associated with the computing device, an amount of bandwidth available within a network associated with the computing device, etc.), an amount of errors, or an amount of operational commands received by the computing device and/or a network device (e.g., a cloud-based device, a server, a computing device, etc.) associated with the computing device.

At 420, audio may be detected. The computing device may detect the audio. The audio may be, for example, from a computing speaking. Detecting the audio may include at least one of voice recognition or natural language processing. The audio may include at least one of a word or a phonetic sound. Portions of the audio content may be detected and/or determined. For example, determining at least a portion of a plurality of portions of the audio may include providing the audio to a trained machine learning model; and causing the trained machine learning model to output the at least the portion of the plurality of portions of the audio.

At 430, an operational command and a confidence score associated with the operational command may be determined. The computing device may determine the operational command and the confidence score based on the audio content. Determining the operational command may include determining that at least one of the word or the phonetic sound corresponds to at least one of a word or a phonetic sound associated with the operational command. The confidence score may indicate at least one of: that a word associated with the audio corresponds to a word associated with the operational command, or that a phonetic sound associated with the audio corresponds to a phonetic sound associated with at least a portion of the operational command. The computing device may be configured for "early exiting," wherein based on detecting (e.g., capturing, interpreting, etc.) a portion of an operational command, one or more complete operational commands are predictively determined. The computing device may determine an inference confidence score indicative of the likelihood that any given one or more complete operational commands is a command intended (e.g., by a user) to be executed (e.g., an "intended command").

At 440, the operational command may be executed. The operational command may be executed based on the confidence score satisfying the early exiting threshold. For example, a low early exiting threshold may be satisfied when the at least a portion of a plurality of portions of the audio corresponds to at least a portion of a plurality of portions of the operational command. An early exiting threshold may be set at any level and may be satisfied by any criterion. The operational command may be associated with a target device. Executing the operational command may include sending the operational command and/or a signal associated with the operational command to the target device to cause the target device to execute the operational command and/or execute a function associated with the operational command.

The method may further comprise determining, based on a network condition, and/or a change therein, one or more of a low early exiting threshold, a medium early exiting threshold, or a high early exiting threshold. For example, a low early exiting threshold may be satisfied when the at least a portion of a plurality of portions of the audio corresponds to at least a portion of a plurality of portions of the operational command. A medium early exiting threshold, for example, may be satisfied when at least two portions of the plurality of portions of the audio correspond to at least two portions of the plurality of portions of the operational command. A high early exiting threshold may be satisfied when each portion of the plurality of portions of the audio corresponds to each portion of the plurality of portions of the operational command. An early exiting threshold may be set at any level and may be satisfied by any criterion. The operational command may be associated with a target device. Executing the operational command may include sending the operational command and/or a signal associated with the operational command to the target device to cause the target device to execute the operational command and/or execute a function associated with the operational command.

Figure 5:
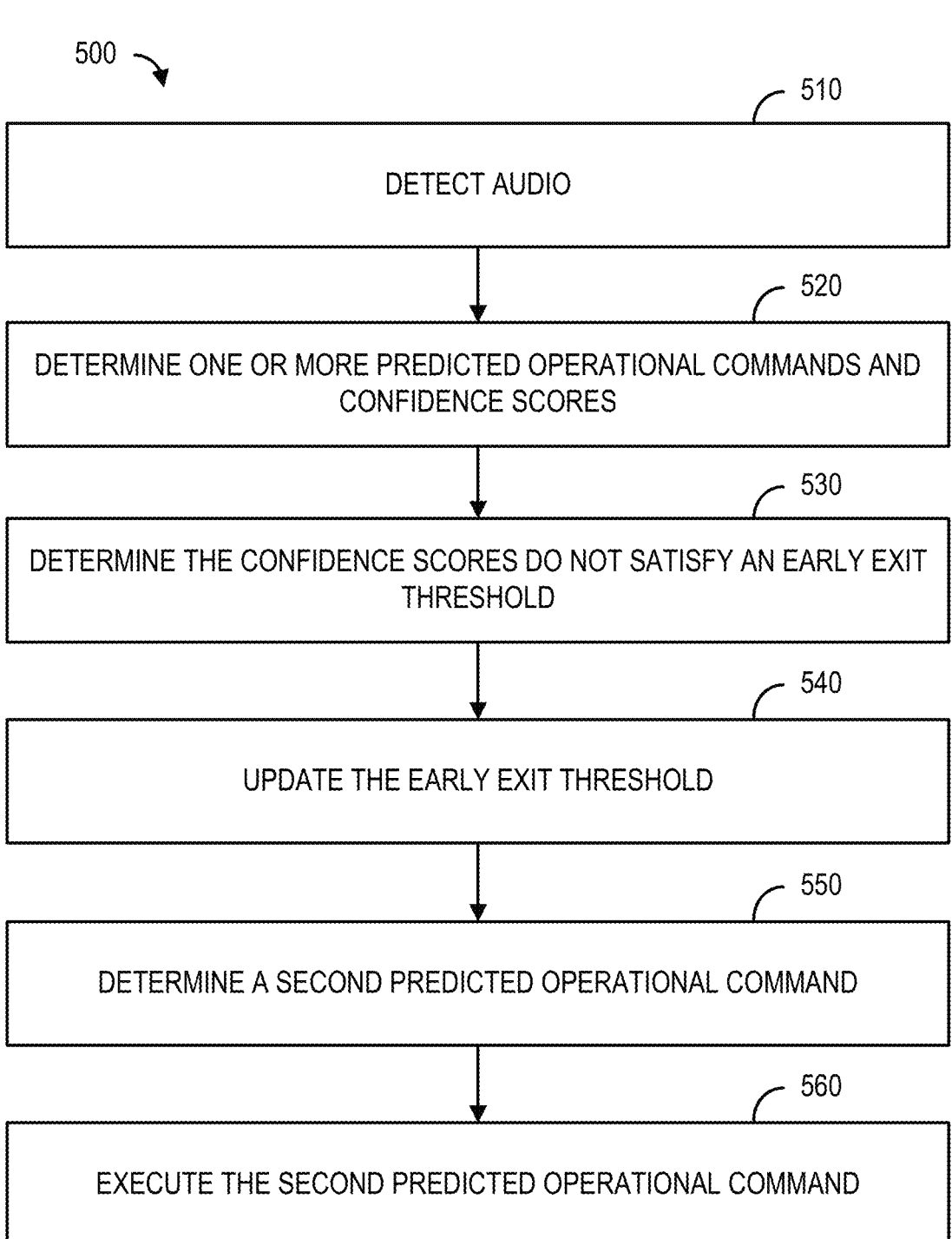
FIG. 5 shows an example flowchart.

FIG. 5 is a flowchart of an example method 500 for voice control. The method may be carried out by any one or more of the devices describes herein such as, for example, the computing device 101. At 510, audio may be detected. The audio may be, for example, from a user speaking. The audio may be received from an audio enabled device such as a voice-enabled user device comprising a microphone. The audio may comprise one or more portions. The computing device may determine the audio comprises an utterance. For example, the computing device may determine an utterance confidence score associated with the audio. The utterance confidence score may indicate a confidence that the detected audio comprises a user utterance (e.g., an intentionally spoken command) as opposed to, for example, background noise. The computing device may compare the utterance confidence score to an utterance confidence threshold, and, based on the utterance confidence score satisfying the utterance confidence threshold, determine the audio comprises an utterance. Based on determining the audio comprises an utterance, the computing device may continue to process the utterance. The utterance may be associated with one or more operational commands.

At 520, one or more initial predicted operational commands and one or more initial confidence scores may be determined. Determining the one or more initial predicted operational commands may comprise determining that the audio comprises at least one word or phonetic sound corresponding to one or more stored operational commands. Determining the one or more initial confidence scores may comprise determining one or more first inference confidence scores associated with the one or more initial predicted operational commands. The one or more first inference confidence scores may indicate a confidence that any given predicted operational command is intended (e.g., by a user) to be executed (e.g., an intended operational command). For example, the one or more first inference confidence scores may indicate a likelihood that any given one or more initial predicted operational commands is the intended operational command. The likelihood may be determined based on a viewing history.

At 530, it may be determined that the one or more initial confidence scores do not satisfy the early exiting threshold. For example, it may be determined that none of the one or more initial inference confidence scores satisfies an inference confidence score threshold. The inference confidence score threshold require a minimum likelihood that any given operational command of the one or more initial operational commands is the intended operational command. For example, the threshold may be a 90% chance and none of the one or more initial inference confidence scores is greater than 50%. The early exiting threshold may be associated with one or more network conditions. The one or more network conditions may include, for example, an amount of data communicated (e.g., by/to the computing device, by/to a device associated with the computing device, within a network associated with the computing device, etc.), an amount of available bandwidth (e.g., an amount of bandwidth available to the computing device, an amount of bandwidth available to a device associated with the computing device, an amount of bandwidth available within a network associated with the computing device, etc.), an amount of errors, or an amount of operational commands received by the computing device and/or a network device (e.g., a cloud-based device, a server, a computing device, etc.) associated with the computing device.

At 540, the early exiting threshold may be updated. The updated early exiting threshold may be determined, for example, based on a change in the network condition. For example, updating the early exiting threshold may comprise determining, based on telemetry information, an indication of a change in at least one network condition; and adjusting, based on the indication of change of the at least one network condition, the early exiting threshold to the higher or lower. For example, a high early exiting threshold may be satisfied when each portion of the plurality of portions of the audio corresponds to each portion of the plurality of portions of the operational command. Determining the high early exiting threshold may include: receiving, from a network device, an indication of a network condition; and adjusting, based on the indication of the network condition, an early exiting threshold to the high early exiting threshold. An early exiting threshold may be set at any level and may be satisfied by any criterion. One or more variable sensitivity settings associated with the one or more network conditions may be used to update (e.g., adjust) the early exiting threshold so as to control how quickly, and whether, an "early exit" or early prediction of an operational command will occur. The sensitivity settings may be adjusted based on one or more network conditions.

At 550, a second operational command and a second confidence score may be determined. The second operational command may be one of the one or more initial predicted operational commands. The second confidence score may be determined based on the first portion of the audio and a second portion of the audio (e.g., a portion of audio received after the first portion of audio). The second confidence score may comprise an updated initial confidence score of the one or more initial confidence scores. The second confidence score may comprise an updated likelihood that the second operational command is the intended operational command. The updated likelihood that the second operational command may be determined based on the viewing history.

At 560, the second operational command may be executed. For example, the second operational command may be executed based on the confidence score satisfying the updated early exit threshold. The operational command may be associated with a target device. Executing the operational command may include sending the second operational command and/or a signal associated with the second operational command to the target device to cause the target device to execute the second operational command and/or execute a function associated with the second operational command.

The method may further comprise determining a second change in the one or more network conditions and further updating the early exiting threshold based on the second change. The method may further comprise determining, based on a network condition, and/or a change therein, one or more of a low early exiting threshold, a medium early exiting threshold, or a high early exiting threshold. For example, a low early exiting threshold may be satisfied when the at least a portion of a plurality of portions of the audio corresponds to at least a portion of a plurality of portions of the operational command. A medium early exiting threshold, for example, may be satisfied when at least two portions of the plurality of portions of the audio correspond to at least two portions of the plurality of portions of the operational command. A high early exiting threshold may be satisfied when each portion of the plurality of portions of the audio corresponds to each portion of the plurality of portions of the operational command. An early exiting threshold may be set at any level and may be satisfied by any criterion. The operational command may be associated with a target device. Executing the operational command may include sending the operational command and/or a signal associated with the operational command to the target device to cause the target device to execute the operational command and/or execute a function associated with the operational command.

Figure 6:
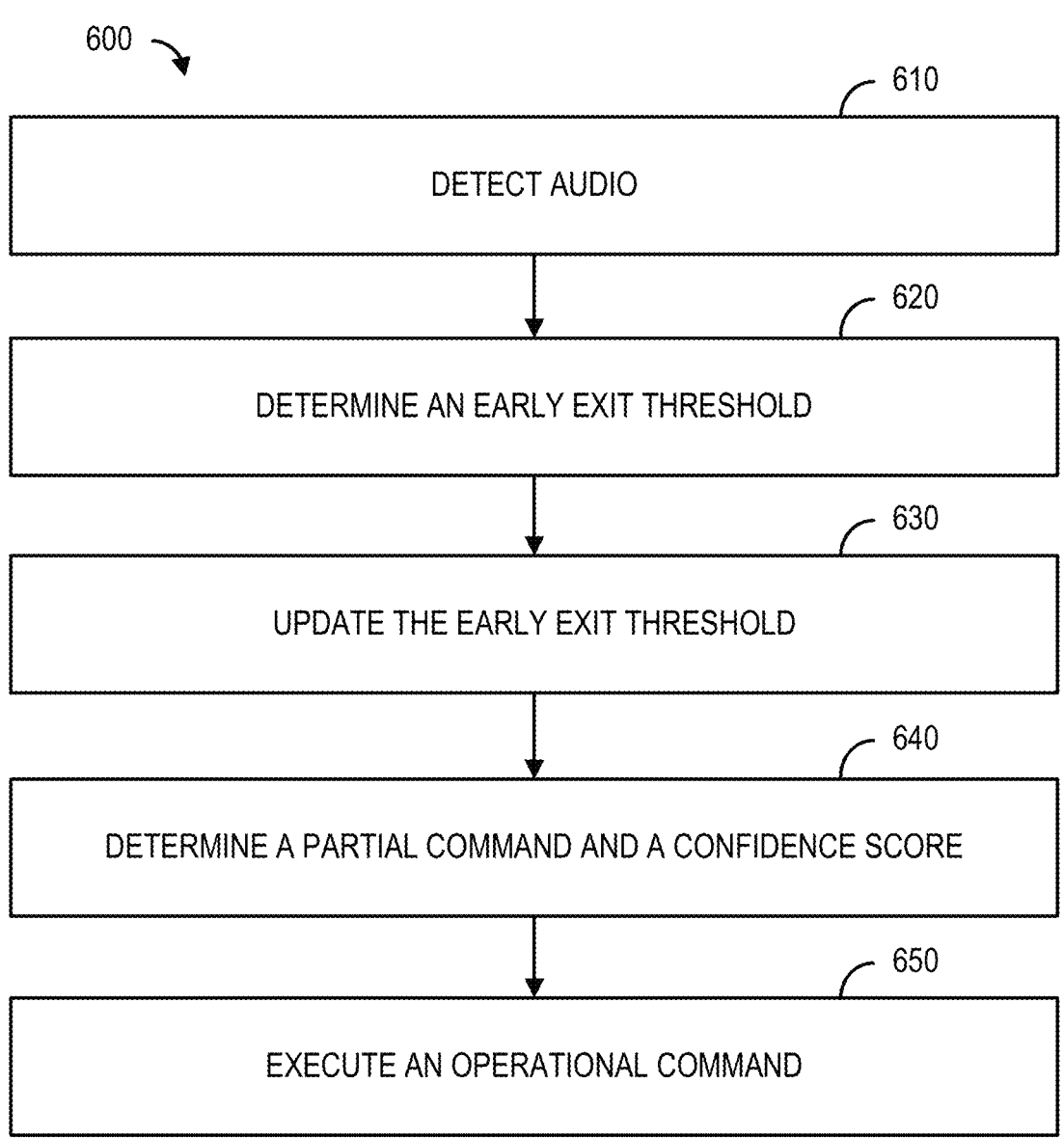
FIG. 6 shows an example flowchart.

FIG. 6 is a flowchart of an example method 600 for voice control. The method may be carried out by any one or more of the devices describes herein such as, for example, the computing device 101. At 610, audio may be detected. The computing device may detect the audio. The audio may be, for example, from a computing speaking. Detecting the audio may include at least one of voice recognition or natural language processing. The audio may include at least one of a word or a phonetic sound. Portions of the audio content may be detected and/or determined. For example, determining at least a portion of a plurality of portions of the audio may include providing the audio to a trained machine learning model; and causing the trained machine learning model to output the at least the portion of the plurality of portions of the audio.

At 620, an early exit threshold may be determined. The computing device (e.g., voice assistant device, voice-enabled device, smart device, computing device, etc.) may determine an early exiting threshold. The early exiting threshold may include at least one of a low early exiting threshold, a medium early exiting threshold, or a high early exiting threshold. The early exiting threshold may be determined based on at least one network condition. The at least one network condition may include at least one of: an amount of data communicated, an amount of available bandwidth, an amount of errors, or an amount of operational commands received.

At 630, the early exiting threshold may be updated. The updated early exiting threshold may be determined, for example, based on a change in the network condition. For example, updating the early exiting threshold may comprise determining, based on telemetry information, an indication of a change in at least one network condition; and adjusting, based on the indication of change of the at least one network condition, the early exiting threshold to the higher or lower. For example, a high early exiting threshold may be satisfied when each portion of the plurality of portions of the audio corresponds to each portion of the plurality of portions of the operational command. Determining the high early exiting threshold may include: receiving, from a network device, an indication of a network condition; and adjusting, based on the indication of the network condition, an early exiting threshold to the high early exiting threshold. An early exiting threshold may be set at any level and may be satisfied by any criterion. One or more variable sensitivity settings associated with the one or more network conditions may be used to update (e.g., adjust) the early exiting threshold so as to control how quickly, and whether, an "early exit" or early prediction of an operational command will occur. The sensitivity settings may be adjusted based on one or more network conditions.

At 640, a partial operational command and a first confidence score may be determined. For example, the computing device may determine a first portion of an utterance may comprise a phoneme associated with an "H" sound (e.g., not the voiceless glottal fricative such as found in "who," or "how") but rather the /'ertʃ/ or "aitch" sounds associated with pronunciation of the letter "H." The computing device may determine the phoneme is associated with at least a portion of one or more potential operational commands. The one or more operational commands may comprise one or more channels, one or more operations (e.g., "tune to," "record," "play," etc.), one or more content titles, combinations thereof, and the like.

At 650, an operational command associated with the partial operational command may be executed. For example, based on determining the "H," the computing device may determine the one or more potential operational commands comprise playing, recording, outputting, or otherwise accessing any one of "HBO," "HSN," "HGTV," or "HBHD." Executing the operational command may be based on the at least a portion of the operational command corresponding to the operational command of the plurality of operational commands and the confidence score satisfying the early exiting threshold.

The method may further comprise determining, based on a network condition, and/or a change therein, one or more of a low early exiting threshold, a medium early exiting threshold, or a high early exiting threshold. For example, a low early exiting threshold may be satisfied when the at least a portion of a plurality of portions of the audio corresponds to at least a portion of a plurality of portions of the operational command. A medium early exiting threshold, for example, may be satisfied when at least two portions of the plurality of portions of the audio correspond to at least two portions of the plurality of portions of the operational command. A high early exiting threshold may be satisfied when each portion of the plurality of portions of the audio corresponds to each portion of the plurality of portions of the operational command. An early exiting threshold may be set at any level and may be satisfied by any criterion. The operational command may be associated with a target device. Executing the operational command may include sending the operational command and/or a signal associated with the operational command to the target device to cause the target device to execute the operational command and/or execute a function associated with the operational command.

Figure 7:
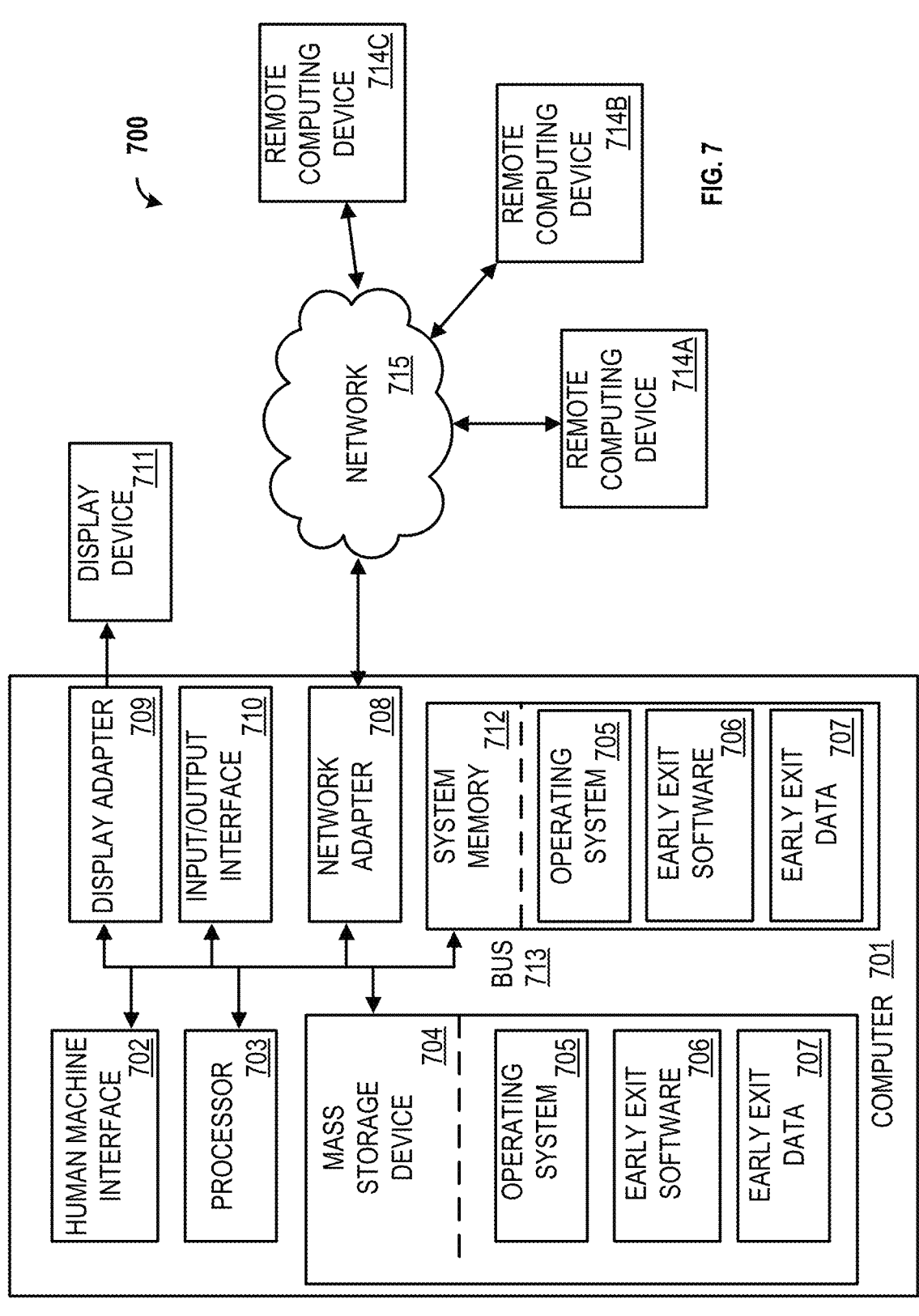
FIG. 7 shows a block diagram of an example computing device.

FIG. 7 shows a system 700 for voice control. Any device and/or component described herein may be a computer 701 as shown in FIG. 7.

The computer 701 may comprise one or more processors 703, a system memory 712, and a bus 713 that couples various components of the computer 701 including the one or more processors 703 to the system memory 712. In the case of multiple processors 703, the computer 701 may utilize parallel computing.

The bus 713 may comprise one or more of several possible types of bus structures, such as a memory bus, memory controller, a peripheral bus, an accelerated graphics port, and a processor or local bus using any of a variety of bus architectures.

The computer 701 may operate on and/or comprise a variety of computer-readable media (e.g., non-transitory). Computer-readable media may be any available media that is accessible by the computer 701 and comprises, non-transitory, volatile, and/or non-volatile media, removable and non-removable media. The system memory 712 has computer-readable media in the form of volatile memory, such as random access memory (RAM), and/or non-volatile memory, such as read-only memory (ROM). The system memory 712 may store data such as early exiting data 707 and/or program modules such as operating system 705 and early exiting software 706 that are accessible to and/or are operated on by the one or more processors 703.

The computer 701 may also comprise other removable/non-removable, volatile/non-volatile computer storage media. The mass storage device 704 may provide non-volatile storage of computer code, computer-readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 704. An operating system 705 and early exiting software 706 may be stored on the mass storage device 704. One or more of the operating system 705 and early exiting software 706 (or some combination thereof) may comprise program modules and the early exiting software 706. Early exiting data 707 may also be stored on the mass storage device 704. Early exiting data 707 may be stored in any of one or more databases known in the art. The databases may be centralized or distributed across multiple locations within the network 715.

A user may enter commands and information into the computer 701 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human-machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

A display device 711 may also be connected to the bus 713 via an interface, such as a display adapter 709. It is contemplated that the computer 701 may have more than one display adapter 709 and the computer 701 may have more than one display device 711. A display device 711 may be a monitor, an LCD (Liquid Crystal Display), a light-emitting diode (LED) display, a television, a smart lens, smart glass, and/or a projector. In addition to the display device 711, other output peripheral devices may comprise components such as speakers (not shown) and a printer (not shown) which may be connected to the computer 701 via Input/Output Interface 710. Any step and/or result of the methods may be output (or caused to be output) in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714A,B,C. A remote computing device 714A,B,C may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network nodes, and so on. Logical connections between the computer 701 and a remote computing device 714A,B,C may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components may reside at various times in different storage components of the computing device 701, and are executed by the one or more processors 703 of the computer 701. An implementation of early exiting software 706 may be stored on or sent across some form of computer-readable media. Any of the disclosed methods may be performed by processor-executable instructions embodied on computer-readable media.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

Example 1

In this example, a resource-efficient methods to short-circuit such streaming command recognition systems in the time domain when the model is confident in its prediction is explored. A frame-level labeling objective is applied to further improve the efficiency-accuracy trade-off. On two datasets in limited-vocabulary commands recognition, the method achieves an average time savings of 45% of the utterance without reducing the absolute accuracy by more than 0.6 points. It was shown that the per-instance savings depend on the length of the unique prefix in the phonemes across a dataset.

For example, the overall system latency can be drastically reduced by short-circuiting streaming command recognition systems across time when the systems are confident in their predictions, since downstream components in query understanding systems often depend on their transcriptions. Early-exited transcription can be used to perform various downstream tasks before the user has finished speaking, thus saving time. In a television entertainment system domain, for instance, a downstream task is to check the availability of a desired channel for the user, requiring slow network calls and database queries.

In this example, the vocabulary was defined as the set of classification classes, with each example having a label sequence length of one (a single class). At first glance, this objective seems to be appropriate because an exit point can be picked using the alignment. However, in practice, CTC results in peaky, overconfident predictions and overly exploits a single path. Additionally, its application is atypical for classification tasks such as in the present example. Nevertheless, it serves as a relevant baseline approach.

Modeling Approaches

In this example, this early-temporal-exiting strategy for streaming, limited-vocabulary commands recognition is explored. To further improve the savings-accuracy tradeoff curves, a simple yet novel frame-level labeling objective that encourages earlier exits is proposed. The method is evaluated on two datasets—one open dataset in simple commands recognition and another in the television entertainment system domain. The main contributions are as follows: First, this example is the first to elucidate and study early exiting in the time domain for speech commands recognition. Second, this example presents a novel method for encouraging earlier exits and improving overall model quality. Finally, this examples provides insight into the early exit points, showing that the per-example savings depend on the length of the smallest unique prefix in the phonetic transcription. The method achieves an average savings of 45% without hurting the absolute accuracy by more than 0.6 points.

A standard RNN encoder architecture was used to model speech. Given 16 kHz, 16-bit audio, a 60-dimensional log-Mel frames with a window of 30 ms and frame shift of 10 ms was constructed. Every three frames were stacked together for a downsampled frame rate of 30 ms. These superframes $x:=(x1, \ldots, xT)$ were fed to a unidirectional RNN, which consists of 1 layers, h hidden units, and either long short-term memory (LSTM) or gated recurrent unit (GRU) cells, depending on the hyperparameters. Finally, the RNN's hidden states were passed to a pointwise, two-layer deep neural network (DNN) with h hidden units, rectified linear unit activations, and $|V|$ output units, producing the final hidden states h1, . . . , $hT \in R^V$, where V is the vocabulary. To produce a probability distribution over the vocabulary, we use the softmax function, i.e., $$p(y_i[k] \mid x_{1:i}) := \frac{\exp(h_i[k])}{\sum_j \exp(h_i[j])} \qquad (1)$$

for $1 \le i \le T$ and $1 \le k \le |V|$.

Early-Exiting Inference Criterion

An entropy of the output distribution was used as the early-exiting criterion during inference. For each $i^{th}$ frame, let the frame-level entropy H(xi), be:

$$H(x_i) := -\sum_{j=1}^{|V|} p(y_i[j] \mid x_{1:i}) \log p(y_i[j] \mid x_{1:i}), \qquad (2)$$

Thus, the lower the entropy, the higher the confidence. Then, an early-exiting threshold was defined as:

$$g(\tau, x) := \min(\{i : H(x_i) \le \tau\} \cup \{T\}). \qquad (3)$$

where $\tau \in R$ is the confidence (entropy) threshold and $\tau$ is the number of frames in x. Put simply, $g(\tau, x)$ is the smallest frame index where the entropy is below $\tau$; if none exist, it returns the final frame index.

Connectionist Temporal Classification Objective

Connectionist temporal classification (CTC) is an objective for modeling sequential label distributions when the frame-level alignment is unknown. Concretely, it augments the vocabulary V with a blank label (b), i.e., $V' := V \cup (b)$. Given some ground truth $y := y1, \ldots, yU)$, it defines a sequence generating function B(y) that produces all strings (alignments) $\hat{y} \in V'^T$ of length T such that, if all consecutive nonblank symbols were joined and subsequent blanks removed, $\hat{y}$ would equal y, e.g., cc(b)aaa(b)(b)t 7→cat. Given some input x, CTC then models the conditional probability marginalized over all possible alignments as:

$$p(y \mid x) = \sum_{y' \in \mathcal{B}(y)} p(y' \mid x), \qquad (4)$$

where the probability distribution on the right is represented by the RNN encoder.

Last-Frame Cross Entropy Objective

The typical approach to limited-vocabulary speech commands recognition is to produce from the utterance a single probability distribution across the labels, and then minimize the cross entropy (CE) loss given the ground truth. For streaming systems, it is common to use the final hidden state of the RNN (or RNN-DNN) as the fixed-length representation and apply a softmax transformation across the labels. The last-frame CE $L_{LF}$ for a single example is:

$$\mathcal{L}_{LF} := -\log p(y_T[c] x), \qquad (5)$$

where c is the ground truth label index and yT is the final hidden state. Although the intermediate output distributions p(yi|x1:i) for all 1<i<T are not explicitly trained, we show experimentally that this popular method produces acceptable early exits.

All-Frame Cross Entropy Objective

For improved early exiting, the method applies the cross entropy objective to all frames instead of only the last. This way, all hidden states are encouraged to be discriminative. That is, for a single example, the all-frame object is:

$$\mathcal{L}_{AF} := -\frac{1}{T} \sum_{i=1}^{T} \log p(y_i[c] \mid x_{1:i}). \qquad (6)$$

To weigh the importance of the final frame versus all the frames, the last-frame loss was added to the all-frame loss with weight $\pi$, for a final objective of $L_{AF} := L_{LF} + \lambda_{AF}$. Although it seems like such a loss would hurt the original accuracy because early frames may not contain the label, we show that it in fact improves the quality for a wide range of 2.

Experimental Setup and Data

The models were implemented in PyTorch 1.6.0. All experiments were conducted on GPU-accelerated machines with Nvidia Tesla V100 and Titan RTX GPUs.

For evaluation, the Google Speech Commands dataset (GSC; v1), which comprises 65,000 one-second utterances split evenly across 30 phonetically distinct words was chosen. Being open and licensed under Creative Commons BY 4.0, this dataset enables easy reproducibility. Following the previous literature, we picked the 10 positive keywords "yes," "no," "up," "down," "left," "right," "on," "off," "stop," and "go." The rest of the keywords were collapsed into the negative class for a total of 11 distinct labels. The training, development, and test sets were distinctly split into sizes of 80%, 10%, and 10% of the dataset—see Table 1 below for a summary of the dataset.

TABLE 1

Summary statistics of ths datasets, where C denotes
the total number of classes, L the average length
of the utterances in seconds, and P and N the numbers
of positive and negative examples, respectively.

| Dataset | Training/Dev/Test Sizes | C | L | P | N |
|---------|-------------------------|-----|------|-------|-------|
| GSC | (51K, 6.8K, 6.8K) | 11 | 1.00 | 23.7K | 41.0K |
| CC20 | (109.7K, 13.7K, 13.7K) | 21 | 2.04 | 40K | 97.2K |

A proprietary dataset for a television entertainment system domain was created. The dataset comprised 40,000 positive samples, split evenly across the top-20 commands, and 100,000 negative samples, divided evenly across 6670 commands. The top-twenty commands represent around 30% of our total traffic. The negative examples were grouped into a single class, for a total of 21 classes, all of which were phonetically unique between the classes. The dataset was collected with the help of an auto-annotation tool, which annotated transcriptions by analyzing subsequent user behaviors and identifying patterns for query reformulation within a given session. That is, the transcriptions were labeled as correct when users provided positive implicit feedback (e.g., button click, user stayed on the program and continued watching). This auto-annotation process yields examples with very low word error rates, thus providing a reliable source for training data. The training, development, and test sets were bucketed into 80%, 10%, and 10% of the dataset, respectively—Table 1 summarizes the dataset statistics. This dataset was named CC20.

For hyperparameters, a batch size of 64 and a learning rate of $5 \times 10^{-4}$ using the Adam optimizer with an exponential decay factor of 0.985 across a maximum of 40 epochs was chosen. The hidden size of the RNN and the number of layers across a grid of {384, 512} hidden units and {1, 2} layers were tuned. For efficiency, this hyperparameter tuning was performed on GSC's development set and the same values were used on CC20. The architecture was fixed and applied the all-frame objective with $\lambda \in$ {0.1, 0.5, 2.5}. To improve the robustness of the model to noise, the same procedure from the Howl keyword spotting toolkit was followed and randomly mix Gaussian noise $<N_{ORMAL}(0, 0.02)$ with 0.2 probability at each training step, along with noise from MUSAN and Microsoft SNSD, with a mixing factor of 0.1 was incorporated.

To be precise, meaningful names were assigned to the resulting models. The base model name is "{LSTM, GRU}–h–l," followed by the objective—CTC, LF (last-frame CE), or AF-$\lambda$ (all-frame CE).

Results

Table 2 (below) presents the model results without early exiting.

TABLE 2

The model accuracy without early exiting.

| # | Model | GSC Dev/Test | CC20 Dev/Test |
|---|---|---|---|
| 1 | LSTM [17] | 94.3/94.5 | — |
| 2 | RNN [8] | —/95.6 | — |
| 3 | GRU-384-1 (CTC) | 92.8/93.1 | 71.5/71.6 |
| 4 | GRU-384-1 (LF) | 95.5/96.0 | 97.9/98.1 |
| 5 | GRU-384-1 (AF-0.1) | 95.8/96.7 | 98.1/98.2 |
| 6 | GRU-384-1 (AF-0.5) | 96.4/96.7 | 98.3/98.4 |
| 7 | GRU-384-1 (AF-2.5) | 96.2/96.5 | 98.1/98.1 |

All models have 670,000 parameters. The present models achieve comparable results to streaming state-of-the-art models. Beam search decoding for the CTC model with a beam width of 100 was attempted, and taking the strongest activation at each time step (i.e., greedy decoding) obtains the same quality. The CTC model converges poorly on CC20, possibly because of more frame-level phonetic confusion between the examples (e.g., "recordings" and "recording pro"), which is a nonissue for GSC. Interestingly, the all-frame objective consistently outperformed LF and CTC by 0.1-0.7 points across a wide range of $\lambda$ values—see rows 5-7 and 3 and 4. It was proposed that the all-frames objective serves as a form of regularization similar to deeply supervised networks, whose hidden features are explicitly trained to be discriminative. In the present example, deep supervision on the final features across time, not the layers was the primary objective.

The early exiting inference strategy as described above was followed, sweeping the entropy threshold $\tau$ from 0 to 1 in increments of 1/300. For each operating point $\tau$, the time savings $\Theta(\tau)$ was computed as the average proportion of the speech utterance that early exiting truncates, i.e., $$\Theta(\tau) = \frac{1}{n} \sum_{i=1}^{n} \frac{T_i - g(\tau, x^{(i)})}{T_i}, \quad (7)$$

30 where $T_i$ is the length in frames of the $i^{th}$ example$^{(i)}$, and $g(\tau, {}^{(i)})_\delta T_i$ is the exit time index given threshold $\tau$ and example$^{(i)}$, as defined in Eqn. (3). A time savings of 0.4 thus means that, on average, the model exits after observing the first 60% of the audio clip.

Figure 8:
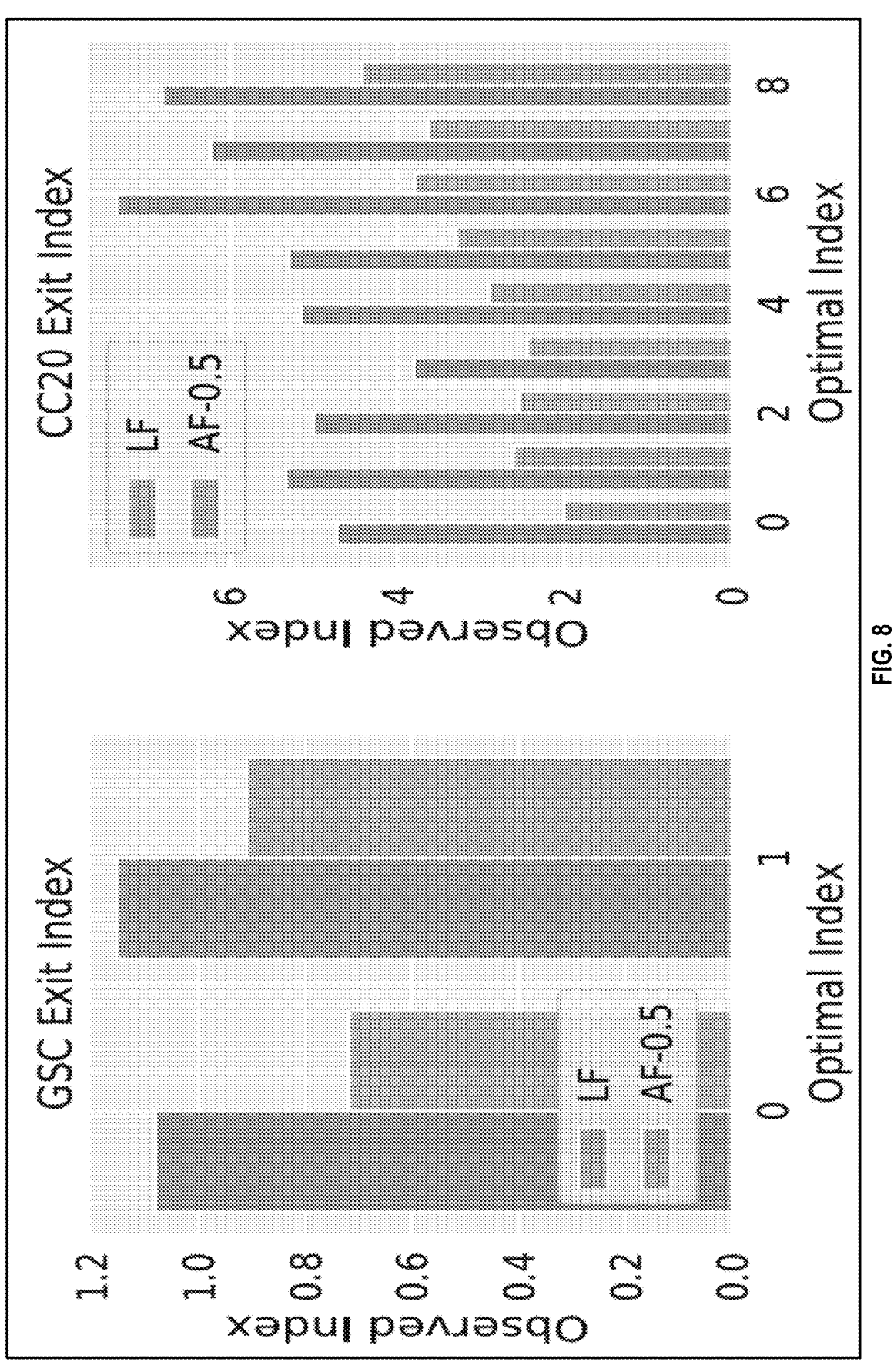
FIG. 8 shows example voice control results.

The resulting time-savings-to-accuracy curves are shown in FIG. 8, with an accuracy cutoff of 85% on both datasets. The AF models achieve similar efficacy, with all of their curves being Pareto-better than the others. In particular, picking $\lambda=0.5$ obtains the highest area under the curve (AUC) for both datasets; at a savings of 0.45, we lose only 0.5 and 0.6 points in absolute accuracy on GSC and CC20, respectively. The AF curves also fall off more gradually than the others, suggesting that the objective smooths the predictions across time.

Early-Exiting Analysis

It was hypothesized that the exit index is smaller for instances with shorter unique phonetic prefixes in the dataset. For negative instances, the unique prefix is compared against the positive set only, because all of the negatives form a single class. For example, consider a dataset with the four transcriptions "Sophie," "Soho," "Ralph," and "Ralphie." Suppose Sophie and Soho are positives and the others negative. Intuitively, Sophie and Soho require more time to disambiguate than does Ralph and Ralphie, which can be classified as negative based on the first phoneme alone, since the negatives form a single class and hence do not require interclass distinction.

To test this hypothesis, a pronunciation dictionary was built by applying the English pretrained finite state transducer-based grapheme-to-phoneme (G2P) model from the Montreal Forced Aligner (MFA) toolkit. The dictionary was supplemented with the LibriSpeech lexicon. Next, the transcriptions were aligned with the audio using MFA, which outputs the most likely phoneme sequence and its constituent time intervals. For each transcription, the optimal exit point was computed as the smallest unique phonetic prefix, taken across the entire dataset for positive examples and the positive set for negatives. In the aforementioned example, the optimal points would be "Soph•ie," "Soh•o," "R•alph,", and "R•alphie." Finally, it is noted the observed phonetic exit index for each clip in the test set.

For the analysis, the models trained on the LF and the AF-0.5 objectives were selected, representing the vanilla method and the best approach, respectively. To enable a direct comparison, the thresholds were picked so that the accuracy between the two models are matched—93.6% on GSC and 95% on CC20. The optimal index was plotted against the observed exit index in FIG. 8. The observed exit index increases with the optimal exit point on both models and datasets, which supports the hypothesis. In agreement with the savings-accuracy curves in FIG. 8, the AF-0.5 model consistently exits earlier than the LF one, as the lower bars show.

CONCLUSION

In this example, early exiting across time for RNNs in speech commands recognition was explored. A simple objective for improving the efficiency-accuracy trade-off was proposed. On a few datasets in limited-vocabulary speech commands recognition, a time savings of 45% was obtained without dropping the accuracy by more than 0.6 points. It was shown that the savings correlate with how easy the phonetics are to disambiguate.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, based on detected audio, a portion of a predicted operational command;
   determining, based on the portion of the predicted operational command, a complete operational command and a confidence score associated with the complete operational command;
   determining one or more network conditions; and
   based on the one or more network conditions, and the confidence score satisfying a command execution threshold associated with how quickly the complete operational command will be executed, executing the complete operational command.

2. The method of claim 1, wherein the one or more network conditions comprise one or more of: an amount of data communicated, an amount of available bandwidth, an amount of errors, or an amount of operational commands or partial operational commands received by a network device.

3. The method of claim 1, further comprising determining the command execution threshold, wherein the command execution threshold comprises one or more network condition thresholds.

4. The method of claim 3, wherein:
   the command execution threshold is satisfied when at least a portion of a plurality of portions of the audio corresponds to at least a portion of a plurality of portions of the predicted operational command.

5. The method of claim 1, further comprising determining, based on a change in the one or more network conditions, an updated command execution threshold.

6. The method of claim 1, further comprising determining the detected audio comprises one or more of: a plurality of phonemes, a plurality of words, or a plurality of phonetic sounds.

7. The method of claim 1, wherein detecting the audio comprises one or more of:
   voice recognition or natural language processing.

8. The method of claim 1, further comprising determining the detected audio corresponds to one or more stored operational commands.

9. The method of claim 1, wherein the confidence score indicates that at least one of: a word associated with the audio corresponds to a word associated with the predicted operational command, or a phonetic sound associated with the audio corresponds to a phonetic sound associated with the predicted operational command.

10. The method of claim 1, wherein the predicted operational command is associated with a target device, wherein executing the predicted operational command comprises sending the predicted operational command to the target device.

11. A method comprising:
   determining, based on a first portion of audio, one or more initial predicted operational commands and one or more initial confidence scores associated with the one or more initial predicted operational commands;
   determining, based on a network condition, a command execution threshold;
   determining the one or more initial confidence scores do not satisfy the command execution threshold;
   updating, based on detecting a change in the network condition, the command execution threshold;
   determining, based on the first portion of the audio and a second portion of the audio, a second predicted operational command and a second confidence score, wherein the second confidence score satisfies the updated command execution threshold; and
   based on the second confidence score satisfying the updated command execution threshold, executing the second predicted operational command.

12. The method of claim 11, wherein the network condition comprises at least one of: an amount of data communicated over a network, an amount of available bandwidth of the network, an amount of network errors, or an amount of operational commands received by a network device associated with the network.

13. The method of claim 11, wherein updating the command execution threshold comprises:
   receiving, from a network device, an indication of the change in the network condition; and
   updating, based on the indication of the change in the network condition, the command execution threshold.

14. The method of claim 11, wherein determining the one or more initial predicted operational commands comprises providing the first portion of the audio to a trained machine learning model.

15. The method of claim 11, wherein determining the one or more initial predicted operational commands comprises:
   determining a first portion of the audio corresponds to a first portion of an operational command;
   determining a second portion of the audio corresponds to a second portion of the operational command; and
   determining, based on the first portion of the audio corresponding to the first portion of the operational command and the second portion of the audio corresponding to the second portion of the operational command, a confidence score.

16. The method of claim 11, wherein the command execution threshold comprises a setting configured to control how quickly the second predicted operational command will be executed.

17. A method comprising:
   detecting audio comprising a partial operational command;
   determining, based on the audio, a first confidence score associated with the partial operational command;
   based on detecting the audio, determining a command execution threshold, wherein the command execution threshold is associated with how quickly a complete operational command associated with the partial operational command will be executed;

determining the first confidence score does not satisfy the command execution threshold;

updating, based on detecting a change in a network condition, the command execution threshold;

determining the first confidence score satisfies the updated command execution threshold; and based on the first confidence score satisfying the updated command execution threshold, executing the complete operational command associated with the partial operational command.

18. The method of claim 17, wherein the network condition comprises one or more of: an amount of data communicated over a network, an amount of available bandwidth of the network, an amount of network errors, or an amount of operational commands received by a network device associated with the network.

19. The method of claim 16, wherein the complete operational command is associated with one or more target devices, wherein executing the complete operational command comprises sending the complete operational command to the one or more target devices.

20. The method of claim 17, wherein the command execution threshold comprises a network condition threshold.

21. The method of claim 17, wherein the first confidence score indicates at least one of: a word associated with the audio corresponds to a word associated with the complete operational command, or a phonetic sound associated with the audio corresponds to a phonetic sound associated with at least a portion of the complete operational command.

\* \* \* \* \*